United States Patent [19]

Lewis et al.

[11] Patent Number: 4,924,500
[45] Date of Patent: May 8, 1990

[54] CARRIER INDEPENDENT NETWORK SERVICES

[75] Inventors: Harry E. Lewis; Gibson D. Ritenour, both of Plano, Tex.; Cho L. Wong, Cary, N.C.; George Gara, Ottawa; Allen F. Eddisford, Stittsville, both of Canada

[73] Assignee: Northern Telecom Limited, Montreal, Canada

[21] Appl. No.: 353,089

[22] Filed: May 17, 1989

[51] Int. Cl.⁵ .............................................. H04M 7/00
[52] U.S. Cl. .................................. 379/201; 379/207; 379/221
[58] Field of Search ................ 379/94, 93, 220, 221, 379/201, 207, 225, 245

[56] References Cited

U.S. PATENT DOCUMENTS 4,313,036  1/1982  Jabarc et al. ..................... 379/207
4,348,554  9/1982  Asmuth ............................. 379/113

Primary Examiner—James L. Dwyer
Attorney, Agent, or Firm—Foley & Lardner, Schwartz, Jeffery, Schwaab, Mack, Blumenthal & Evans

[57] ABSTRACT

The present invention provides a method of establishing Carrier Independent Network Services (CINS) wherein feature and voice information are decoupled such that feature information is transmitted on a signalling link established on private and/or public facilities, but voice information is transmitted over a public network when calls overflow, thereby permitting the terminating node to identify the incoming call and associate feature information provided by the originating node.

8 Claims, 3 Drawing Sheets

CARRIER INDEPENDENT NETWORK SERVICES

FIELD OF THE INVENTION

This invention relates to private telephone network services but more particularly to a method of providing network services within a private/corporate network using the public network for basic call transport with call feature related information transported over a private signalling link.

BACKGROUND OF THE INVENTION

When nodes in a private network become overloaded with intra-network calls, such calls will be re-routed from the private network to an available public network. The problem that arises when calls re-routed to hybrid and analogue public networks, is that call feature information available on ISDN and CCS7 private networks, such as calling and connected name, calling number and general feature related information, will no longer be available at the terminating node.

Arrangements whereby overflow calls on private networks and the like are switched over a public network have been described in U.S. Pat. No. 4,348,554 which issued to Richard L. Asmuth on Sept. 7, 1982. In the Asmuth patent, the foregoing problems are solved by describing a method of reducing the cost of providing private facilities, to simplify the procedure by which a customer may tailor its telephone services to assure cost minimization, and to further improve dedicated facility service. In particular, instead of purchasing a dedicated private network, a customer obtains virtual private network services over the public switched network, thereby minimizing its cost.

Information defining a virtual private network is stored in a data base, accessible by those telephone offices which have been defined as part of the virtual private network. This information includes a description of the capacity of the virtual network and resources. In response to a call received at one of the offices directed to the virtual network, a verification is made at the data base that the call is entitled to be completed via the virtual network and that an idle virtual resource on the public network remains for assignment to the call. The idle virtual resource is assigned to the call, and the call is completed over the public switched network. Although Asmuth provides an alternative service to virtual private customers, the problem associated with overflow calls remain for those customers who have existing dedicated private networks and services.

There is accordingly a requirement to provide a network service which will allow intra-network calls that overflow to the public network, and which has the ability to deliver private networking services that are transparent to the public network.

SUMMARY OF THE INVENTION

The foregoing problems are solved by providing a network service which allows a private/corporate network customer to overflow intra-network traffic into the public network and yet still provide the customer with a complete set of network services via the private signalling network. Particularly, feature and voice information are de-coupled such that feature information is transmitted on a signalling link established on private and/or public facilities, but voice information is transmitted over a public network when calls overflow, thereby permitting the terminating node to identify the call and associate feature information provided by the originating node.

In particular, the present invention provides a method of establishing Carrier Independent Network Services (CINS). This is achieved by generating an intra-network call between a first station at an originating node and a second station at the terminating node. Once initiated, a CINS request message is sent from the originating node to the terminating node, via the signalling link network connecting the originating and terminating nodes. At the terminating node, a Virtual Directory Number (VDN) is selected from a VDN table and assigned to the intra-network call.

A reply message containing the selected VDN is then returned to the originating node, again via the signalling link. The intra-network call can then be established with the VDN through a public network. At the terminating node, the incoming call with the specific VDN is received via the public network. The VDN is then translated to a real directory and line equipment number as well as the call related information provided in the initial request message to establish the intra-network call between the calling station and the called station.

DESCRIPTION OF THE DRAWINGS

Preferred embodiments of the invention will now be described in conjunction with the accompanying drawings in which.

DETAILED DESCRIPTION

With the present invention, it should be assumed that each private network node will have connectivity to an external network (e.g. Public) via Direct-In-Dial (DID) and Direct-Out-Dial (DOD) trunking facilities. It should also be assumed that the private network nodes are connected either via a private data signalling link or a dialled-up signalling link that will deliver the network feature information between the originating and terminating private network nodes.

Figure 1:
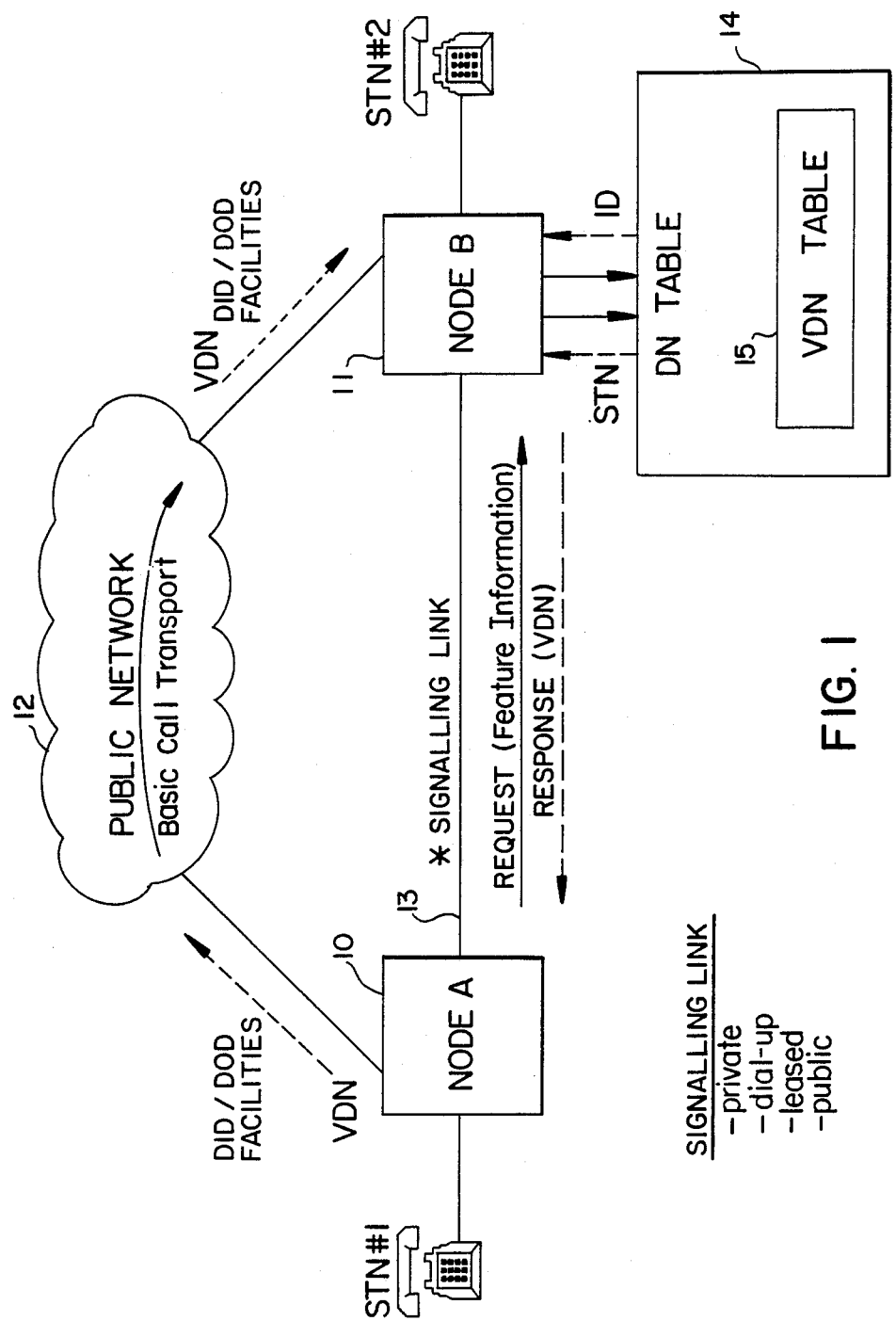
FIG. 1 is an illustrative view of a basic call transport scenario according to a first embodiment of the invention.
Figure 2:
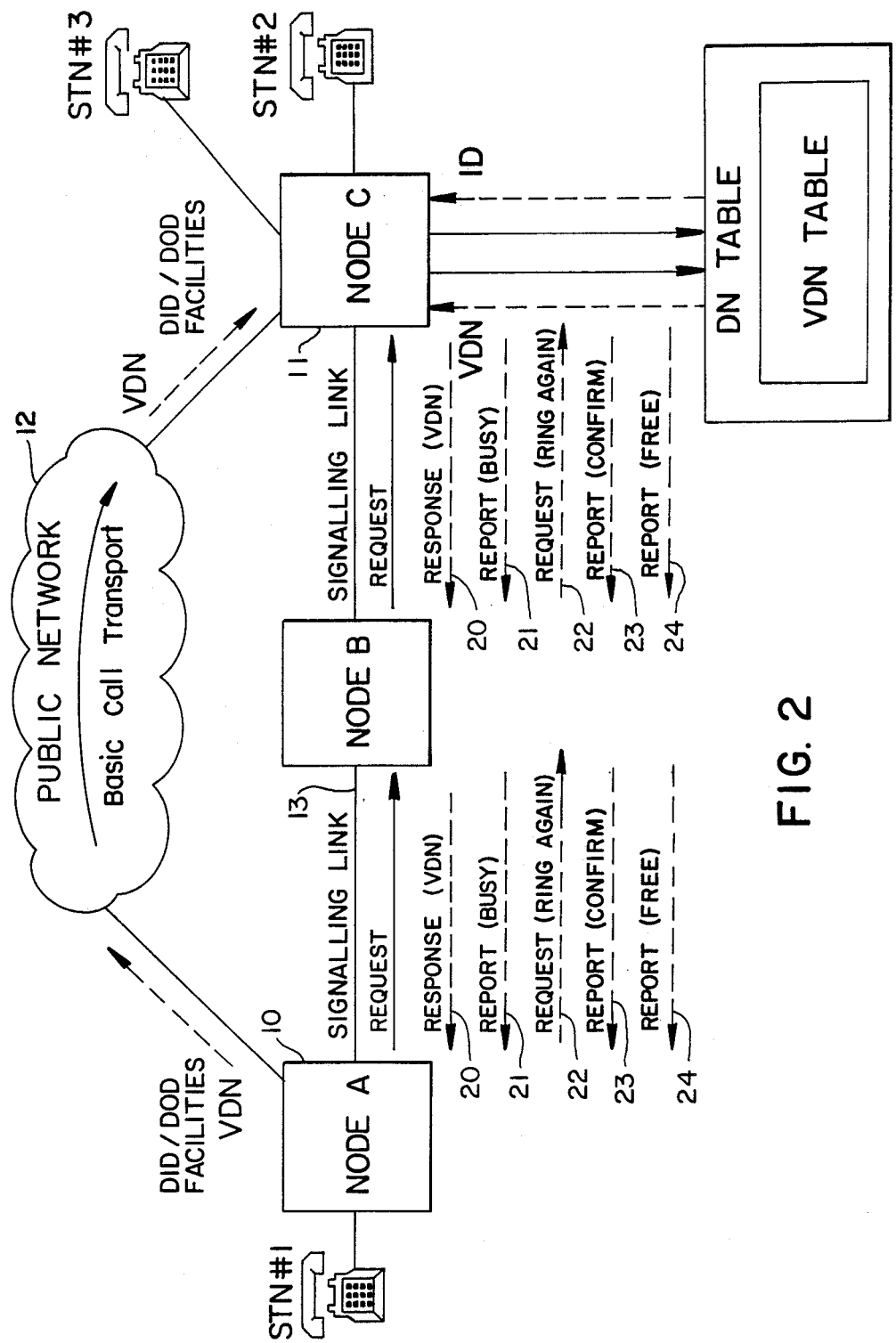
FIG. 2 is an illustrative view of a network ring again call service transport scenario according to another embodiment of the invention.

Referring now to FIG. 1, we have shown the basic call transport scenario of the Carrier Independent Network Service of the present invention. In this configuration, Station #1 is requesting a connection to Station #2. Upon dialling the private extension or directory number of Station #2, Station #1's request is processed at Node A shown at reference numeral 10. If the call is to be transported via the Public Network 12, then a request for a Virtual Directory Number (VDN) will be sent to Node B shown at reference numeral 11, via the private signalling link 13, connecting Node A to Node B. It should be noted that the Request message may tandem through other nodes within the private network, as is shown in FIG. 2. This request will contain the feature related network information such as the number of the calling and called stations, call redirection, calling name or any other network feature information associated with the private network. The Request message will provide the originating "call reference" identification in order that the terminating node can communicate network feature information during call establishment and disestablishment. Once the request message is received at Node B, the number or extension of the called station (#2) is translated to an equipment number at table 14, to identify the terminating station (i.e. station #2). If the terminating station number is a valid directory number, i.e. a number assigned in the private network, the request message is assigned a Virtual Directory Number (VDN) and all associated network feature information is stored in Table 15. The VDN can be a valid public Plain Old Telephone Service (POTS) directory number that is not assigned within the private network, but is the mechanism for linking the originating and terminating entities with the call and feature related information. The Virtual Directory Numbers are considered as a network service resource within the terminating node and are only active when assigned by the terminating node in response to a request by another node within the private network. If the public node delivers a Virtual Directory Number which has not been assigned, i.e. a misdialled number, to an intra-network call request, the incoming call will be given the appropriate call treatment within the terminating node, e.g. attendant intercept, recorded announcement and/or busy tones, etc. The Response message which is sent from Node B to Node A, will include the selected VDN, terminating network feature information as well as the terminating "Call Reference" identification in order that the originating node (Node A) can communicate during the establishment and disestablishment of the call. The VDN is returned to Node A over the signalling link 13. Node A Will then provide over the (DOD) facilities, the VDN address digits to the public network 12 to establish the basic call between the two private nodes within the private network. This address information can be supplied via in-band or out-of-band signalling types. The public network 12 will then establish a basic connection from the originating private network node (Node A) to the terminating network node (Node B).

Once at the terminating node 11, the public network 12 will transmit the VDN address digits via (DID) facilities with in-band or out-of-band signalling mechanisms. The terminating node call processing will determine that the incoming digits are associated with an active VDN by accessing the VDN table 15. The corresponding network call information will then be coupled with the incoming network call. Terminating node 11 will then "alert" the called Station #2 and present the feature related information. All network service interaction may be communicated over the signalling link using the established originating and terminating "call references".

During the basic call establishment via the public network, the originating and terminating nodes may optionally provide a continuity and security check that will validate an intra-network call as well as end-to-end connectivity. The continuity check will allow one node to transmit a specific security tone to the receiving node to validate the call before proceeding with call completion.

In the transport scenario of FIG. 2, Station #1 of Node A is attempting a connection with Station #2 of Node C via a tandem Node B. In this embodiment, the basic call transport remains the same. However, Station #2 is busy in conversation with Station #3. The originating node (Node A) sends an overflow Request message to the terminating node (Node C) to select a Virtual Directory Number. The VDN Response message 20 is returned to the originating node (Node A) via the signalling link. The originating node (Node A) will provide the VDN address digits to the public network via (DOD) facilities. The public network will establish the Basic Call connectivity and transmit the VDN address digits over the public network facilities to Node C. The call processing at the terminating node (Node C) will translate the VDN and associate the initial call information provided. With Station #2 and #3 in conversation, the incoming call will be terminated with busy treatment. A Report message 21 will be generated from the terminating node (Node C) indicating that Station #2 is busy. The calling station (Station #1) equipped with the Network Ring Again (NRAG) feature as described herein, sends a "network ring again" Request 22 to Node C. Once received, Node C will send a Report message 23 to confirm that the "network ring again" has been activated. When the called station (Station #2) is on-hook again, another Report message 24 will be sent from Node C via Node B to notify the calling par&:y at Station #1 that the terminating station (#2) is free/idle. If Station #1 accepts the NRAG request, the basic call set up described above is initiated.

Figure 3:
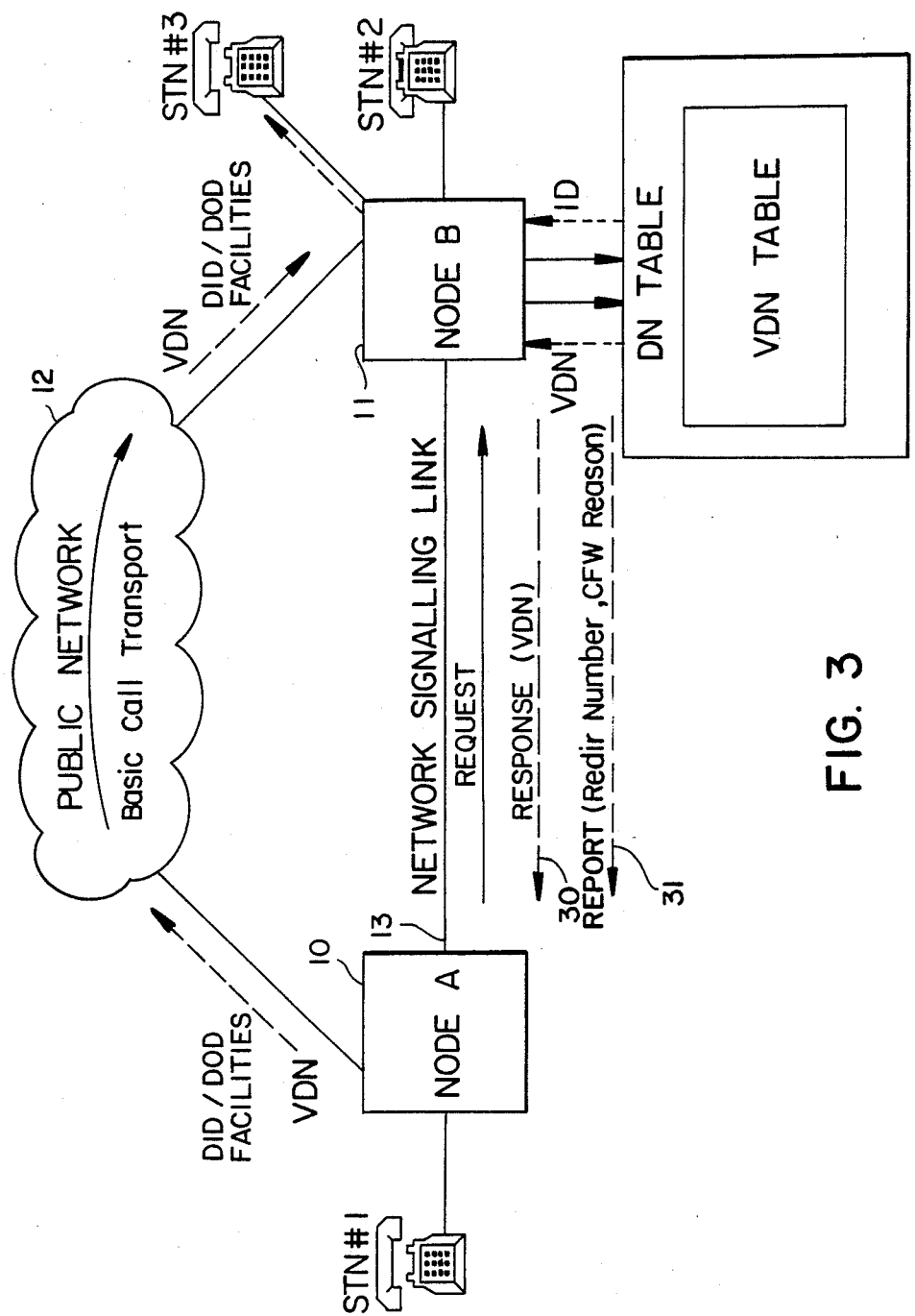
FIG. 3 is an illustrative view of a call redirection transport scenario according to another embodiment of the invention.

The embodiment of FIG. 3 illustrates a Call Redirection transport scenario in which, the called party, i.e. Station #2 has activated a "call forwarding" feature. In this embodiment, calls directed to Station #2 are redirected to Station #3. Once the selected VDN 30 has been received at Node A, the VDN address digits are transmitted to the public network. When the terminating node (Node B) receives the incoming VDN, the call processing at the terminating node (Node B) will indicate that calls to Station #2 are forwarded to Station #3. Accordingly, the incoming call is connected to Station #3. A Report message 31 containing such network call information as redirection number and call reference is sent to Node A.

The above examples illustrate the basic CINS approach for providing networked feature transparency when calls overflow to the public network. The basic CINS mechanism identifies the originating and terminating "Call Reference" that allows the nodes in the private network to communicate these services. With "Call References" established between call processing units (originating and terminating), current and future network services can be deployed to ensure feature transparency independent of the basic call and feature signalling transport.

Other applications may be devised using the basic call transport scenario described herein. For example, a global/international network is feasible using the concept defined in the present invention. Call related information could be sent via satellite signalling link, while the voice and VDN is forwarded via common interexchange carriers, undersea cables or satellite links, etc.

What is claimed is:

1. A method of establishing carrier independent network services (CINS), comprising the steps of:
    generating an intra-network call between a first station of a originating node and a second station of a terminating node;
    sending a CINS request message from said originating node to said terminating node, via a signalling link connected between said originating node and said terminating node;

selecting a virtual directory number (VDN) at said terminating node to be assigned to said intra-network call;

sending a first reply message containing said selected VDN from said terminating node to said originating node;

transmitting said intra-network call with the VDN through a public network;

receiving said transmitted intra-network call with the VDN at said terminating node;

translating the VDN to a real directory number, line equipment number and network feature information; and establishing a "call reference" between the originating and terminating nodes to link the first and second stations for the delivery of assigned network features between them.

2. A method of establishing carrier independent services (CINS) as defined in claim 1, further comprising the steps of:

sending a report message with said first reply message to indicate operating status of said second station.

3. A method as defined in claim 2, further comprising the steps of:

sending a network ring again request, if said report message indicates that said second station is off-hook, from said first node to said second node;

sending a second reply message from said second node to said first to confirm network ring again; and sending a third reply message from said second node to said first to notify said first node when said second station is on-hook again.

4. A method as defined in claim 2, further comprising the steps of:

sending a report message with said first reply message indicating redirection of calls from said second station to a third station, said report message containing directory information of said third station.

5. A method as defined in claim 1, wherein said CINS request and reply messages are routed from said first node to said second node via a third node.

6. A method as defined in claim 5, further comprising the steps of:

sending a report message with said first reply message indicating redirection of calls from said second station of said second node to a third station of a third node, said report message containing directory information of said third station.

7. A method of establishing Carrier Independent Network Services (CINS) as defined in claim 1, further comprising the steps of:

sending a continuity and security check with said request message in order to validate said call.

8. A method as defined in claim 7, wherein said continuity and security check comprises the transmission of a predetermined security tone from the originating node to the terminating node such that said request message can be validated at the terminating node.

* * * * *